(No Model.)

E. E. QUIMBY.
WHEEL TIRE.

No. 575,783.  Patented Jan. 26, 1897.

Witnesses
A. M. Jones.
E. Gatterer

Inventor
Edward E. Quimby

UNITED STATES PATENT OFFICE.

EDWARD E. QUIMBY, OF ORANGE, NEW JERSEY, ASSIGNOR TO THE NORTH BRITISH RUBBER COMPANY, LIMITED, OF EDINBURGH, SCOTLAND.

WHEEL-TIRE.

SPECIFICATION forming part of Letters Patent No. 575,783, dated January 26, 1897.

Application filed December 1, 1894. Serial No. 530,563. (No model.)

*To all whom it may concern:*

Be it known that I, EDWARD E. QUIMBY, of Orange, New Jersey, have invented certain Improvements in Wheel-Tires, of which the following is a specification.

This improvement relates to a wheel-tire of the type of that shown and described in United States patent to William Erskine Bartlett, dated January 5, 1892, and serially numbered 466,532.

The invention consists of an inflatable annular tube, an annular flexible tire approximately U-shaped in cross-section provided along each of its edges with two concentric ribs substantially triangular in the shapes of their cross-sections, the said tire embracing the said tube, in combination with an annular rim provided upon its convex side with a circumferential recess presenting upon the inner face of each of its side walls two concentric grooves adapted to afford the bearings for and to retain the said concentric ribs of the tire when they are seated in said recesses and the said tube is inflated.

Figure 1:
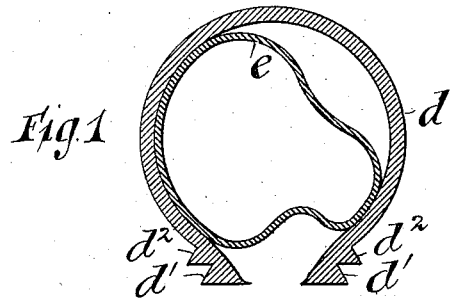
Figure 2:
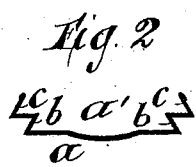
Figure 3:
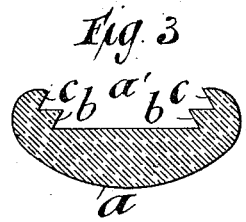
Figure 4:
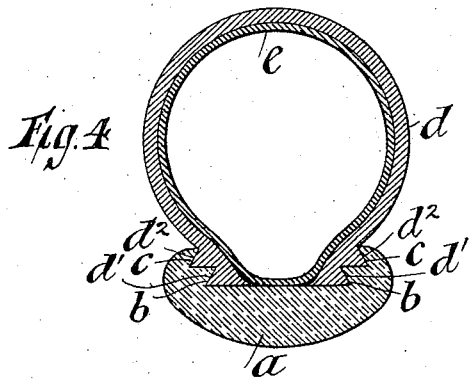

The accompanying drawings, illustrating the improvement, are as follows:

Figure 1 is a cross-section of a tire composed of rubber or other flexible material U-shaped in cross-section and provided on each of its opposite edges with two parallel ribs approximately triangular in cross-section, also showing in cross-section the inner tube in its deflated condition. Fig. 2 is a cross-section of a circumferentially-recessed metallic wheel-rim suitably grooved to receive and retain the tire-ribs. Fig. 3 is a cross-section of a wooden wheel-rim similarly grooved and recessed. Fig. 4 is a cross-section of the wooden rim of Fig. 3, the ribbed tire, and inner tube, showing the parts assembled, with the tube in its inflated condition and the tire-ribs seated in their respective grooves in the rim.

In carrying this improvement into practice there may be employed a sheet-metal wheel-rim having approximately the shape in cross-section represented in Fig. 2, or there may be employed the wooden wheel-rim $a$ represented in Fig. 4. On its exterior or convex side the wheel-rim is provided with a circumferential recess $a'$. Each of the walls of the said recess $a'$ has formed in it two concentric V-shaped grooves $b$ and $c$.

The tire $d$, of rubber or other flexible material, is provided near its edges with the concentric ribs $d'$ $d'$, substantially triangular in their cross-sections and so proportioned that the outermost ribs $d'$ $d'$ fit the grooves $b$ $b$ in the wheel-rim, while the adjoining ribs $d^2$ $d^2$ fit the grooves $c$ $c$ in the wheel-rim.

Within the tire $d$ is the inflatable tube $e$. When the parts are assembled and the inner tube $e$ inflated, the portions of the tire near its edges are thrust outwardly and the ribs are thus compressed into their seats in the concentric grooves $b$ $b$ and $c$ $c$, as illustrated in Fig. 4, whereby the tire is locked in place.

What is claimed as the invention is—

1. A tire of flexible material in arched form, having on its exterior convex surface and near each edge, two parallel ribs or projections, substantially as described.

2. The combination of a wheel-rim provided with a circumferential recess having in each of its walls or sides two channels, the transverse distance between the sides of the inner channels nearest the axis of the wheel being less than the transverse distance between the sides of the outer channels, a tire of flexible material provided with ribs adapted to be seated in said channels and an inflatable tube within said tire serving when inflated to hold the ribs of the said tire to their respective seats in the said channels, substantially as described.

3. The combination of an annular tire of flexible material having near each of its edges two parallel ribs or projections, a wheel-rim having a recess with its walls grooved and channeled to receive said ribs and an inflatable tube within said tire serving when inflated to hold the ribs of the said tire to their respective seats in the said channels, substantially as described.

4. A tire of flexible material adapted to assume a U-shaped form in cross-section and to be applied to a wheel-rim, said tire having on its exterior convex surface and near each edge angular projections or ribs $d'$ and adjacent to said projections angular projections or ribs $d^2$, said ribs $d'$ and $d^2$ respectively at each side of said tire having their homologous sides parallel, substantially as described.

5. A wheel-rim having a circumferential recess, the said recess being in the form of a double dovetail $b\,b$, $c\,c$ with outwardly-converging sides, the distance between the sides $b\,b$ being less than the distance between the sides $c\,c$, substantially as described.

6. The combination, as herein set forth, of an annular wheel-rim presenting upon its convex side a circumferential recess, the side walls of which are provided with concentric grooves V-shaped in their cross-sections, a tire of flexible material approximately U-shaped in cross-section and provided near its edges on each side with two parallel ribs approximately triangular in cross-section and adapted to be seated in the said V-shaped concentric grooves in the side walls of the said circumferential recess in the wheel-rim and an inflatable annular tube contained within the said rubber tire and serving when inflated to compress the ribs of said tire into their respective seats in the said concentric grooves.

EDW. E. QUIMBY.

Witnesses:
A. M. JONES,
E. GATTERER.